Figures 3, 4:
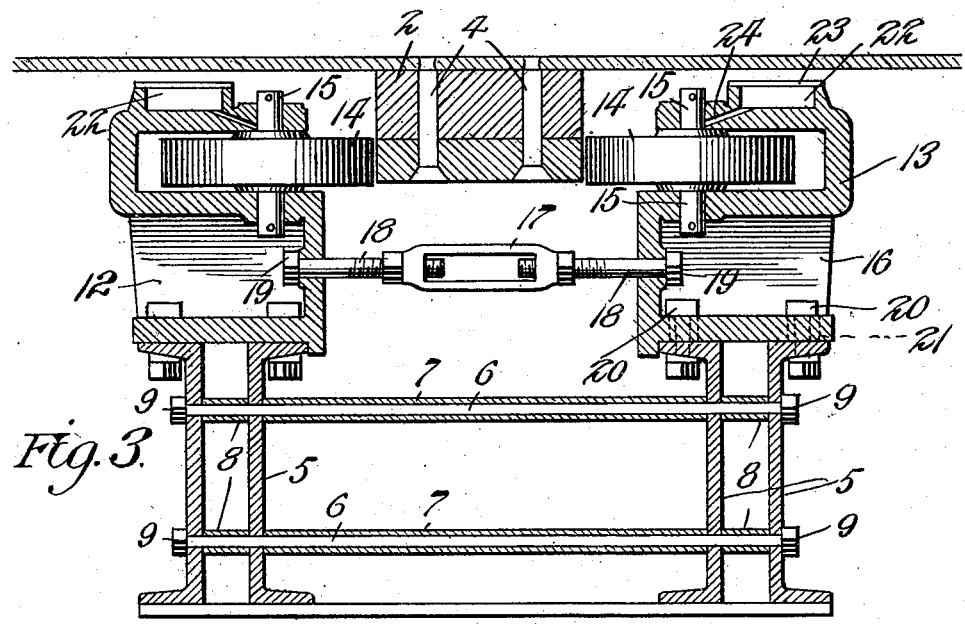

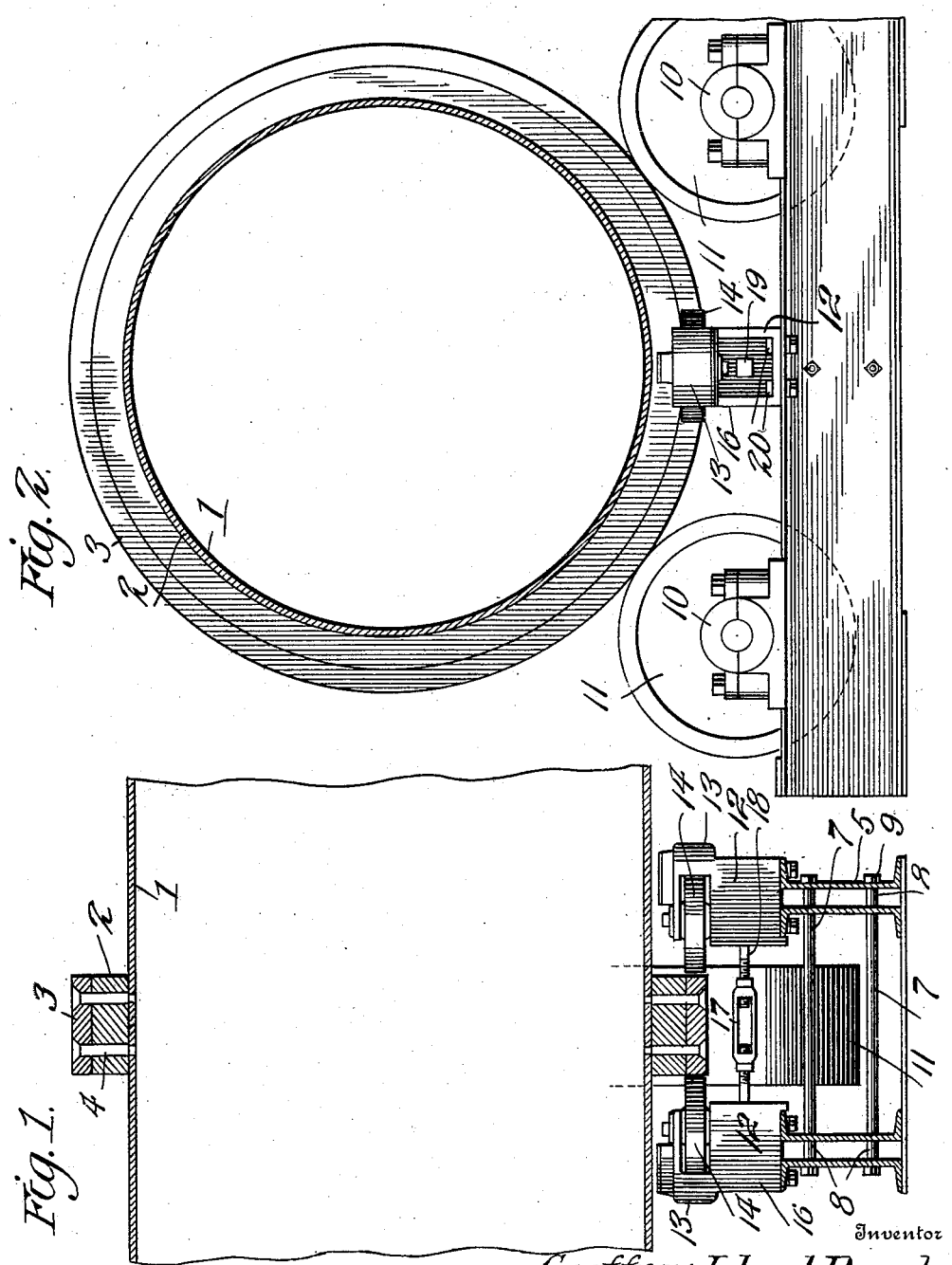

No. 889,043. PATENTED MAY 26, 1908.
G. L. PREACHER.
END THRUST BEARING FOR DRIERS AND SCREENS.
APPLICATION FILED JAN. 8, 1908.
2 SHEETS—SHEET 2.

Witnesses

Inventor
Geoffrey Lloyd Preacher
By Victor J. Evans
Attorney

UNITED STATES PATENT OFFICE.

GEOFFREY LLOYD PREACHER, OF AUGUSTA, GEORGIA.

END-THRUST BEARING FOR DRIERS AND SCREENS.

No. 889,043.  Specification of Letters Patent.  Patented May 26, 1908.

Application filed January 8, 1908. Serial No. 409,845.

*To all whom it may concern:*

Be it known that I, GEOFFREY LLOYD PREACHER, a citizen of the United States, residing at Augusta, in the county of Richmond and State of Georgia, have invented new and useful Improvements in End-Thrust Bearings for Driers and Screens, of which the following is a specification.

This invention relates to end thrust bearings for driers, screens and the like, the object of the invention being to provide an effective bearing device for the purpose stated, applicable to any rotary drier or screen and adapted to effectively sustain the end thrust thereof and also to take up or compensate for wear.

With the above general object in view, the invention consists in the novel construction, combination and arrangement of parts herein fully described, illustrated and claimed.

In the accompanying drawings:—Figure 1 is a vertical sectional view of a thrust bearing embodying the present invention, showing a section of a rotary drier or screen associated therewith. Fig. 2 is an end view of the thrust bearing, showing the drier or screen in section. Fig. 3 is an enlarged section through one of the end thrust bearings of this invention. Fig. 4 is a sectional plan view of the same.

Referring to the drawings, 1 designates a rotary drier or screen of any suitable form having a cylindrical body.

For the purpose of carrying out the present invention, the screen or drier 1 is provided at one or more points in the length thereof with trunnion rings or collars 2 encircling the same and preferably provided with bearing rims 3, the rims 3, and the rings or collars 2 being securely fastened to the shell of the drier or screen by suitable fasteners 4 in the form of bolts or rivets or the like, each of the trunnion rings or collars being thus firmly secured to the shell of the drier or screen.

The rotary drier or screen is mounted upon a suitable supporting base which is shown as comprising sets of channel beams 5 arranged in parallel relation to each other and secured together by tie rods 6 incased in spacing sleeves 7 and 8 and headed as shown at 9 or provided with nuts whereby a strong, rigid structure is obtained.

Mounted in bearings 10 secured to the supporting base are supporting rollers 11 which are located in line with the trunnion rings or collars 2 so that said collars move in contact with the rollers 11, as clearly indicated in Figs. 1 and 2.

It will be understood that the rotary drier or screen may be provided with any number of trunnion rings or collars and that a set of supporting rollers 11 may be used in connection with each of said trunnion rings or collars in order to give the necessary support to the rotary drier or screen at suitable intervals in the length thereof. Furthermore, while the rotary drier or screen is shown as disposed horizontally, it will be understood that the construction thus far described and the remainder of the construction to be hereinafter described is equally applicable to rotary screens or driers which are set at an inclination or angle to the horizontal.

Mounted upon the supporting base and secured to the top flanges thereof are oppositely arranged roller stands 12 each of which is provided with a slotted head portion 13 in which is mounted an end thrust roller 14 having oppositely projecting journals 15 which are disposed vertically and mounted in suitable bearings in the stand 12 as clearly shown in Figs. 1 and 3. The rollers of the two stands set exactly opposite each other and turn on vertical axes confining the adjacent trunnion ring or collar between them and thereby sustaining the end thrust of the rotary drier or screen.

The roller stands are recessed as shown at 16 and the recessed portions of the stands are connected by a take up device which, in the preferred embodiment of the invention, is in the nature of a turn-buckle, comprising a double ended nut 17 and oppositely projecting rods 18 which extend through the recessed portions of the roller stands and are provided with heads or nuts 19. By this means, the roller stands may be adjusted toward each other to take any wear which may occur between the end thrust rollers and the trunnion rings or collars. In order to admit of such adjustment of the stands 12, they are connected to the supporting base by means of fastening bolts 20 or their equivalent which pass through the lower portions of the stands and also through the flanges of the channel beams 5, the roller stands being slotted as shown at 21 where the bolts pass through them, thereby admitting of the necessary amount of movement of the stands on the supporting base. The adjustment may be effected by loosening the bolts 20 and tightening the take up device and after obtaining the desired adjustment, again tightening the securing bolts 20.

Each of the stands 12 is preferably provided with an oil cup 22 having a suitable lid or cover 23 and also having an oil duct or extension passage 24 leading to the bearing of the adjacent end thrust roller.

Having thus described the invention, what is claimed as new, is:—

1. The combination with a rotary cylindrical body, of a trunnion ring extending around the same and carried thereby, end thrust rollers disposed at opposite sides of said trunnion ring or collar, stands in which said end thrust rollers are journaled, and a take up device connecting said stands for adjusting the distance between the end thrust rollers and preventing said rollers from moving apart.

2. The combination with a rotary cylindrical body, of a trunnion ring or collar encircling the same and carried thereby, a supporting base, end rollers located at opposite sides of the trunnion ring or collar, and roller stands by which said rollers are carried mounted on the base and adjustable toward and away from each other.

3. The combination with a rotary cylindrical body, of a trunnion ring or collar surrounding said body and carried thereby, a bearing rim encircling said trunnion ring or collar and forming a section thereof, end thrust rollers located at opposite sides of the trunnion ring or collar and adapted to work in contact with said bearing rim, stands in which said end thrust rollers are journaled, a supporting base on which said roller stands rest, and a take up device connecting said stands.

4. The combination with a rotary cylindrical body, of one or more trunnion rings or collars encircling said body and carried thereby, one or more sets of end thrust rollers arranged at opposite sides of each trunnion ring or collar, roller stands in which said end thrust rollers are journaled, and means for adjusting said stands to take up the wear between said rollers and each trunnion ring or collar, substantially as described.

In testimony whereof I affix my signature in presence of two witnesses.

GEOFFREY LLOYD PREACHER.

Witnesses:
J. G. BELDING,
CLAUDE P. BACON.